Dec. 22, 1964 S. SIEGEL ETAL 3,161,967
EDUCATIONAL APPARATUS AND METHOD
Filed May 22, 1963 2 Sheets-Sheet 1
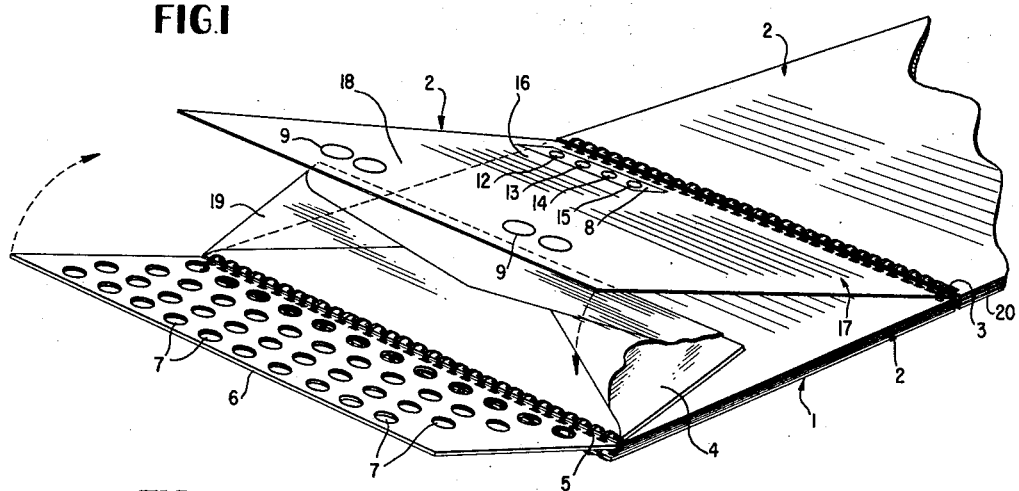
INVENTORS
SIDNEY SIEGEL
JOHN H. EMORE, JR.
BY
Wynne and Finken
ATTORNEYS Dec. 22, 1964  S. SIEGEL ETAL  3,161,967
EDUCATIONAL APPARATUS AND METHOD
Filed May 22, 1963  2 Sheets-Sheet 2

INVENTORS
SIDNEY SIEGEL
JOHN H. EMORE, JR.
BY
Wynne and Finken
ATTORNEYS

United States Patent Office 3,161,967
Patented Dec. 22, 1964

3,161,967
EDUCATIONAL APPARATUS AND METHOD
Sidney Siegel, 5332 Locust St., Philadelphia, Pa., and John H. Emore, Jr., 101 Church St., Ambler, Pa., assignors of one-third to Stationers' Guild of America, Philadelphia, Pa., a corporation of Pennsylvania
Filed May 22, 1963, Ser. No. 282,254
5 Claims. (Cl. 35—5)

This invention relates to an educaional device and more specifically to a method and apparatus for self teaching and practice of touch typing.

The standard method of teaching typing first involves memorizing the keyboard by visual association of the various letters, numerals and punctuation marks with the fingers and the keyboard positions thereof. It has required extensive training under professional guidance to acquire the requisite familiarity with the keyboard and subsequent practice necessary to attain great digital ability leading to speed and accuracy. For the average student it is almost impossible to acquire the necessary familarity and skill by self teaching and without professional guidance. There have been several attempts in the prior art to provide self teaching devices and methods. U.S. Patent 1,527,100 is typical of the prior art attempts and utilizes visualization as the stimulus to develop the position memory of the fingers on the keyboard. In the aforementioned patent the memory is acquired by visual association of a particular key from a picture of the keyboard with the position on a practice typing board. Such self teaching systems have not been successful, for most students are not capable of the high degree of concentration necessary to master the keyboard.

It is therefore an object of this invention to provide a method and device for teaching of touch typing which utilizes tactile sensory stimuli rather than visualization.

Another object is an educational device and method for teaching touch typing which does not require a high degree of concentration and which develops a high memory efficiency in the student's fingers.

Further objects of the invention include the provision of a compact educational device which is simple to understand and follow and which may be used both for classroom study and self teaching. Other objects and advantages will be apparent to those skilled in the art.

The method and apparatus of the present invention initiate in the fingers of the student a conditioned muscular reflex action in response to a tactile stimulus in the fingers. This stimulus is established by means of a plurality of discs or tap keys of substantial thickness to simulate the feel of typewriter keys which are placed in predetermined selected positions on a typing board to represent typewriter keys to be learned for each lesson. For example, it has been found that the average student can readily acquire the stimulus and sensation identifying three to four typewriter keys in a single lesson. Accordingly, four discs or tap keys are preferably provided to represent selected typewriter keys. The teaching system is thus preferably divided into about twelve lessons, there being about forty-four keys, including the alphabet, numerals, punctuation, and shift keys. The initial lessons are directed toward developing in the student a recognition of the home keys, "a," "s," "d," "f," "k," "l" and ";" from which the fingers move to selected keys.

When the fingers tap firmly these discs in a predetermined order, the impact upon the tactile sense initiates a kinesthetic muscular response which sets up the "reaches" of the fingers to the various keys of the typewriter involving various distances and various placements until a series of conditioned reflexes or non-voluntary reactions is established for the entire keyboard. When the tap keys which initiated the original sense stimulus are removed, the conditioned reflex actions developed in the fingers remain and become the knowledge of the student. The tap keys bear no character identification, but are preferably color coded to identify the keys for each lesson. The color code associates a color in the mind of the student with each key to be learned and creates a vivid persistent impression which develops high memory efficiency without any apparent effort.

This concise and scientific system of acquiring familiarity, speed and accuracy in touch typewriting is preferably assembled in book-like form. One embodiment of the apparatus comprises a backing member with hinge means located at opposite top and bottom edges thereof. A plurality of lesson sheets are hinged to the top edge of the rigid backing member and each sheet bears a key code and a printed instruction area on the top half of the sheet, the bottom half of the sheet being designated as a typing area which bears coded indicia or dots representing selected typewriter keys to be learned for each particular lesson. A perforated flat typing board of substantial thickness is hinged at the bottom edge of the backing member and simulates the standard keyboard of a typewriter. When it is placed to overlie the bottom half of the lesson sheet to outline the typing area, the coded dots are exposed through the corresponding openings or guide keyholes in the typing board. A plurality of correspondingly coded discs, preferably four in number, thicker than the typing board, are provided to simulate the feel of actual typewriter keys. The discs are placed in selected holes of the typing board over the coded dots on the lesson sheet. Means are provided for securing the discs in the holes of the typing board to withstand inadvertent displacement by normal digital typewriting strikes, while being easily removable to a different group of selected holes for different lessons.

In one embodiment, the discs are small permanent magnets and a thin sheet of ferromagnetic material, such as steel, is hinged at the bottom edge of the backing member, whereby said sheet may underlie the selected lesson sheet. The selected lesson sheet is thereby sandwiches between the sheet and the perforated typing board and magnetic attraction holds the discs in position in the selected holes of the typing board.

In another embodiment, the discs are provided with an interlocking fiber material on their bottom surfaces and the coded dots of the lesson sheets similarly provided with such material to hold the discs in place. Other securing means may be employed, such as releasable pressure sensitive adhesives.

The present invention, both as to its organization and manner of operation together with further objects and advantages thereof, may best be understood by reference to the following description taken in connection with the accompanying drawings in which:

FIG. 1 is an isometric view of a self teaching device embodying the present invention;

FIG. 2 is a perspective view of a self teaching device as it is used by the student when he practices a lesson on the typing board;

FIG. 3 is a sectional view taken along lines 3—3 of FIG. 2;

FIG. 4 represents another embodiment of the invention showing other means for holding the tap keys on the lesson sheet.

Figure 5:
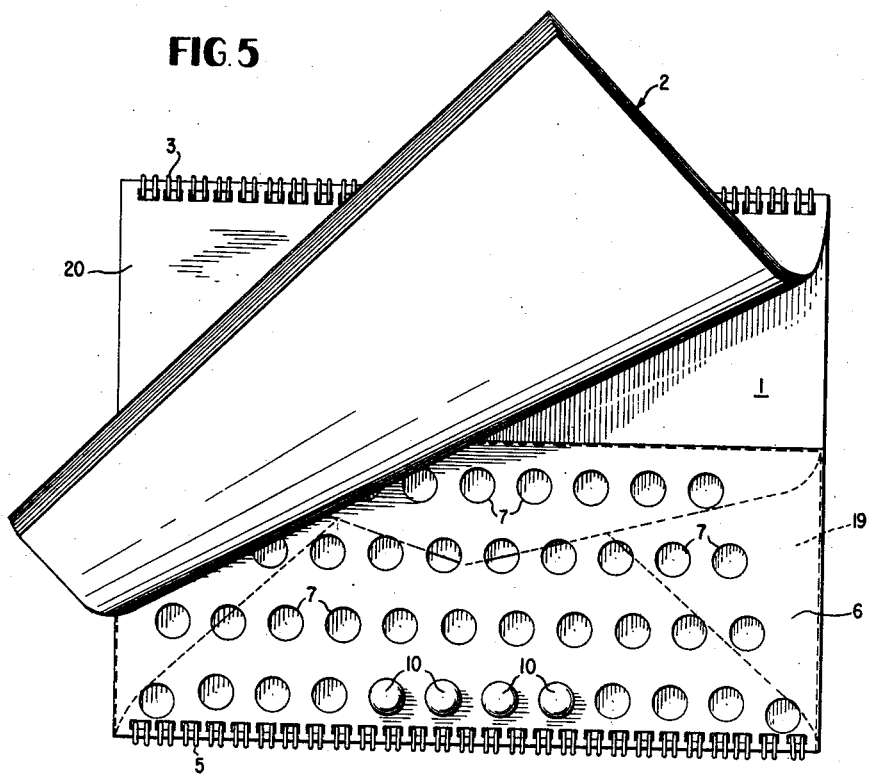
FIG. 5 is a view in perspective showing the apparatus of the invention and further showing the position of the tap keys when the device is not in use.

Referring now to FIGS. 1–3 of the drawings, the self teaching apparatus of the present invention comprises a backing member 1. A plurality of lesson sheets 2 and a cover 20 are hinged to the top edge of the backing member by means of a spiral spring 3. Each lesson sheet extends toward the bottom edge of the backing member and includes on the top half 16 a color code 8 and an instruction area 17. The color code 8, printed in the top left corner of the page, consists of a group of different contrasting colors 12, 13, 14, and 15, each color representing a particular key of the typewriter keyboard to be learned in a particular lesson. The bottom half 18 of the lesson sheets is the typing area and includes colored indicia or dots 9 which correspond to color code 8 which represent the predetermined typewriter keys to be learned in each lesson. A second spiral spring 5 mounted on the bottom edge of the backing member 1 hingedly supports a typing board 6 which has a substantial thickness, on the order of 1/16 inch, for example. The spring 5 also hingedly supports a thin plate 4 of steel or other ferromagnetic material which in the embodiment shown is carried in an envelope 19 hinged to backing member 1. The typing board 6 has a series of four rows of openings or guide keyholes 7 which simulate the key arrangement of a standard typewriter. These keyholes fulfill the dual function of guiding the fingers of the student during the practice of a lesson and, because of the thickness of the board, of positioning and holding the coded, magnetic discs or tap keys 10 against lateral displacement. The color of the respective tap keys matches the color of the code 8 and the dots 9 printed on the lesson sheets. The discs 10 are thicker than the typing board 6, on the order of 3/16 inch, for example, and may be made of permanently magnetized Alnico or other permanent magnetic material.

In use, as best illustrated in FIGS 2 and 3, the selected lesson sheet 2 is sandwiched between the plate 4 enclosed in envelope 19 and the typing board 6 which covers the bottom half 18 of the lesson sheet 2. The colored dots 9 on the sheet 2 are exposed through the corresponding guide keyholes 7 in the typing board 6. These colored dots 9 represent the keys that the student will learn to tap in the lesson. The magnetic discs or tap keys 10 are then matched to the color exposed through the keyholes of the typing board and are placed, colored side up, into the proper guide keyhole 7 of the typing board 6. They are held in position against the lesson sheet by their magnetic attraction to the plate 4 underlying the typing area 18. When the tap keys 10 are tapped by the fingers of the student, lateral displacement of the keys from their respective keyholes is prevented by the thickness of the typing board 6.

FIGURE 5 illustrates the device when not in use. The typing board 6 is placed directly over the envelope 19 carrying the ferromagnetic sheet. The magnetic discs 10 are then positioned in the holes at the bottom of the board 6 and are retained by their magnetic attraction. The plurality of lesson sheets 2 and the cover 20 are then positioned over the discs and typing board to form a compact book-like device which is readily portable while preventing loss of the tap keys 10.

In the embodiment shown in FIGURE 4, the tap keys or discs are made of suitable plastic or the like and carry on their bottom surfaces a layer of interlocking fiber and material 11 (such as "Velcro") laminated thereto. Each coded dot on the lesson sheets 2 similarly is provided with such interlocking fiber material, whereby the discs may be firmly but removably secured by the interlocking material to the lesson sheet. It will be apparent that further methods of removably securing the tap keys in position may be used, such as releasable pressure sensitive adhesives.

In the method of the invention utilizing the device as illustrated in the drawings, the student is first instructed to locate and become familiar with the "home" or "guide" keys "a," "s," "d," "f," "j," "k," "l" and ";". Thus, the instruction sheet for the first lesson directs the student to place the typing board 6 over the bottom half of the lesson sheet. This sheet is provided with numerals 1, 2, 3, 4, 5, 6, 7, and 8, which respectively correspond to the above home keys and which are exposed through the corresponding perforations in the typing board. The student is then instructed as to the proper placement of the fingers in these perforations and several exercises are set forth which develop familiarity or "feel" for the home position. It will be noted that at this initial stage of instruction, the tap keys are not used and no further identification of the keys is acquired; the purpose is solely to acquaint the student with the home position.

After the student has mastered the feel of the home keys on the typing board 6, he then proceeds through a sequence of lessons which develop the familiarity with and memory of each of the typewriter keys, utilizing in each lesson three or four tap keys.

A typical lesson will now be described, with particular reference to FIG. 2 of the drawings. In this example the keys to be learned are "s," "d," "k," and "l" corresponding to the color coded dots 12, 13, 14, and 15, respectively which appear in the instructional area of the lesson sheet for this lesson. In a particular embodiment, "s" (dot 12) is black, "d" (dot 13) is yellow, "k" (dot 14) is red, and "l" (dot 15) is green. The correspondingly colored discs or tap keys 10 are positioned in the appropriate holes of the typing board 6 over the correspondingly coded dots exposed therethrough which correspond to the positions of these keys, as shown in FIG. 2.

The instructional material for this lesson advises the student to place his fingers over the home keys and holes (the student having previously acquired familiarity with the location of the home keys), as explained above. Tapping exercises for the keys are then undertaken, first tapping out a number of times the individual letters "s," "d," "k," and "l," referring only to the color code 12–15 for initial association of the fingers with the respective keys. The student is instructed to look only at the copy to be tapped out on the keys and to repeat to himself the key being tapped. Thereafter various combinations of the letters "s," "d," "k," and "l" are tapped in sequences and combinations as set forth in the instructions. When the student has mastered the lesson on these four keys and in a similar lesson the remaining home keys "a," "f," "j," and ";" so that he can tap out various combinations thereof without looking at the color code or his hands, he then proceeds to practice this knowledge, thus far limited to the eight home keys, on an actual typewriter. Further lessons are similarly provided for the remaining keys on the typewriter, in groups of three or four keys per lesson, to acquire mastery of the reaches from home position, the student proceeding first to master the limited number of keys for each lesson on the typing board and then on a typewriter. In a preferred embodiment, a total of twelve lessons are provided, each lesson involving the mastery of a limited number of new keys on the typing board utilizing the tap keys and subsequent practice on an actual typewriter.

From the foregoing example it is apparent that according to the present invention the student learns the key positions without being distracted or confused by the mechanics of the typewriter and without visually memorizing the keyboard. The student's concentration is entirely on the position of the keys through the sense of touch. There is thus first initiated in the student's fingers a tactile stimulus and thereafter initiated through said tactile stimulus a series of conditioned reflex actions representing the distances and placements of a limited group of keys. The tactile stimuli (i.e., the discs or tap keys) are removed and the student proceeds to apply the acquired knowledge to the actual typewriter. Further lessons are similarly undertaken for further groups of keys until the aforementioned reflex actions are acquired over the entire keyboard.

It will be apparent that the educational device of the invention may be used for practice and review at any time without the necessity of an actual typewriter.

It will be understood that the invention is not to be limited to the construction shown and described but that various changes and modifications may be made without departing from the spirit and scope of the invention as defined in the appended claims.

We claim:

1. An educational apparatus for self teaching of typewriting comprising
    a flat backing member having hinge means positioned at opposite top and bottom edges thereof,
    a plurality of lesson sheets hinged to the top edge of said backing member, said sheets bearing coded indicia representing about four selected typewriter keys in correlated positions on the bottom portion of each sheet and bearing an indicia code and instructions on the top portion of each sheet,
    a flat typing board hinged to said bottom edge of said backing member, said board having a plurality of holes simulating the complete keyboard of a typewriter and adapted to overlie the bottom portion of said lesson sheets to expose said coded indicia through corresponding holes in said board,
    a plurality of discs of substantial thickness simulating typewriter keys coded to correspond to the indicia on said lesson sheets,
    and means for removably securing said discs in selected holes of said typing board to withstand inadvertent displacement thereof by normal digital typewriting strikes on said discs.

2. The apparatus set forth in claim 1 wherein said indicia and said discs are coded with corresponding colors and said discs bear no other identifying indicia.

3. The apparatus set forth in claim 1 wherein said typing board is of substantial thickness but thinner than said discs whereby lateral displacement of the discs from selected holes in the typing board is avoided.

4. The apparatus set forth in claim 1 wherein said discs comprise permanent magnets and a sheet of ferromagnetic material is hinged to said bottom edge whereby a lesson sheet may be sandwiched between said typing board and said sheet of magnetic material and the discs are removably secured in selected holes of the typing board by magnetic attraction.

5. The apparatus set forth in claim 1 wherein said securing means comprises interlocking fiber material on the bottom surface of said discs and on the coded indicia of said lesson sheets which are exposed through the holes of the typing board.

References Cited by the Examiner

UNITED STATES PATENTS 1,527,100 2/25 Williams _____ 35—5
1,614,390 1/27 Randall _____ 35—5

JEROME SCHNALL, *Primary Examiner.*

LAWRENCE CHARLES, *Examiner.*